US010272414B1

(12) United States Patent
Hernandez-Maldonado et al.

(10) Patent No.: US 10,272,414 B1
(45) Date of Patent: Apr. 30, 2019

(54) REMOVAL OF CARBON DIOXIDE FROM GAS MIXTURES USING ION-EXCHANGED SILICOALUMINOPHOSPHATES

(71) Applicants: Arturo J Hernandez-Maldonado, Mayaguez, PR (US); Milton E Rivera-Ramos, Ponce, PR (US); Ana G Arevalo-Hidalgo, Mayaguez, PR (US)

(72) Inventors: Arturo J Hernandez-Maldonado, Mayaguez, PR (US); Milton E Rivera-Ramos, Ponce, PR (US); Ana G Arevalo-Hidalgo, Mayaguez, PR (US)

(73) Assignee: University of Puerto Rico, San Juan, PR (US)

(*) Notice: Subject to any disclaimer, the term of this patent is extended or adjusted under 35 U.S.C. 154(b) by 0 days.

(21) Appl. No.: 15/245,565

(22) Filed: Aug. 24, 2016

Related U.S. Application Data

(62) Division of application No. 12/334,768, filed on Dec. 15, 2008, now Pat. No. 10,052,610.

(51) Int. Cl.
*B01D 53/02* (2006.01)
*B01J 20/18* (2006.01)
*B01J 20/30* (2006.01)

(52) U.S. Cl.
CPC ............ *B01J 20/186* (2013.01); *B01D 53/02* (2013.01); *B01J 20/3078* (2013.01);
(Continued)

(58) Field of Classification Search
None
See application file for complete search history.

(56) References Cited

U.S. PATENT DOCUMENTS

| 3,140,249 A | * | 7/1964 | Rosinski | ............. B01J 20/18 |
| | | | | 208/120.01 |
| 4,440,871 A | * | 4/1984 | Lok | ................. B01J 20/18 |
| | | | | 208/114 |

(Continued)

OTHER PUBLICATIONS

"Ion Exchange in Molecular Sieves by Conventional Techniques" Townsend and Harjula in "Post-Synsthesis Modification I" Hellmutt G. Karge et al. (Springer Science & Business Media. Jan. 11, 2002, p. 1-9.*

(Continued)

*Primary Examiner* — Melvin C. Mayes
*Assistant Examiner* — Colette B Nguyen
(74) *Attorney, Agent, or Firm* — Hoglund & Pamias, PSC; Roberto J. Rios (57) ABSTRACT

$Na^+$-SAPO-34 sorbents were ion-exchanged with several individual metal cations for $CO_2$ absorption at different temperatures (273-348 K) and pressures (<1 atm). In general, the overall adsorption performance of the exchanged materials increased as follows: $Ce^{3+}<Ti^{3+}<Mg^{2+}<Ca^{2+}<Ag^+<Na^+<Sr^{2+}$. The strontium exchanged materials excelled at low-pressure ranges, exhibiting very sharp isotherms slopes at all temperatures. The $Sr^{2+}$ species were responsible for the surface strong interaction and the cations were occupying exposed sites (SII') in the materials Chabazite cages. All the sorbent materials exhibited higher affinity for $CO_2$ over the other gases tested (i.e., $CH_4$, $H_2$, $N_2$ and $O_2$) due to strong ion-quadrupole interactions. $Sr^{2+}$-SAPO-34 sorbents are by far the best option for $CO_2$ removal from $CH_4$ mixtures, especially at low concentrations.

13 Claims, 10 Drawing Sheets

(52) U.S. Cl.
CPC ..... *B01J 20/3085* (2013.01); *B01D 2253/116* (2013.01); *B01D 2253/304* (2013.01); *B01D 2253/311* (2013.01); *B01D 2257/504* (2013.01)

(56) References Cited

U.S. PATENT DOCUMENTS

| | | | | |
|---|---|---|---|---|
| 4,666,875 | A | * | 5/1987 | Pellet .................... C10G 11/05 502/214 |
| 4,684,617 | A | * | 8/1987 | Lok ......................... B01J 29/85 423/306 |
| 4,882,038 | A | * | 11/1989 | Lok ......................... B01J 29/85 208/111.25 |
| 5,501,848 | A | * | 3/1996 | Nakagawa ............. C01B 37/08 423/706 |
| 5,958,366 | A | * | 9/1999 | Smith ..................... C01B 39/02 423/700 |
| 6,046,373 | A | * | 4/2000 | Sun ......................... B01J 29/06 204/157.15 |
| 6,150,293 | A | * | 11/2000 | Verduijn .................. C07C 4/06 502/63 |
| 2006/0052233 | A1 | * | 3/2006 | Beeckman ............. B01J 20/183 502/60 |

OTHER PUBLICATIONS

"Solid-State Ion Exchange in Microporous and Mesoporous Materials" Karge and Beyer in "Post-Synsthesis Modification I" Hellmutt G. Karge et al. (Springer Science & Business Media. Jan. 11, 2002, p. 43-50.*

"Ion Exchange in Molecular Sieves by Conventional Techniques" Townsend and Harjula in "Post-Synsthesis Modification I" Hellmutt G. Karge et al. (Springer Science & Business Media. Jan. 11, 2002, p. 1-9. (Year: 2002).*

"Solid-State Ion Exchange in Microporous and Mesoporous Materials" Karge and Beyer in "Post-Synsthesis Modification I" Hellmutt G. Karge et al. (Springer Science & Business Media. Jan. 11, 2002, p. 43-50. (Year: 2002).*

* cited by examiner

REMOVAL OF CARBON DIOXIDE FROM GAS MIXTURES USING ION-EXCHANGED SILICOALUMINOPHOSPHATES

GOVERNMENT INTEREST

The invention was made with U.S. Government support under grant number NNX08BA48A awarded by the National Aeronautics and Space Administration (NASA) and grant number OIA0701525 awarded by the National Science Foundation (NSF). The government has certain rights in this invention.

FIELD OF THE INVENTION

The present invention relates to the selective removal of $CO_2$ from light gas mixtures. More specifically, it relates to the use of ion-exchanged $M^{n+}$-SAPO-34 materials for the adsorption of $CO_2$.

BACKGROUND OF THE INVENTION

The selective removal of $CO_2$ from mixtures of gases is necessary to help addressing environmental and energy related problems, respectively. For example, it is well known that the efficient capture of $CO_2$ from industrial emissions will help to mitigate greenhouse effects. On the energy side, a considerable part of the natural gas reserves in the US (~17%) is treated to remove high $CO_2$ concentrations, as the pipeline quality for $CO_2$ concentration is less than 2%. This "contaminant" reduces the energy content of natural gas, causing it to miss the pipeline quality requirement for minimum heating value (970 BTU/ft$^3$). Amine absorption is the most widely used method today for the removal of $CO_2$ from $CH_4$ streams, but this technique is highly complex and therefore costly.

Adsorption processes using microporous and mesoporous (known together as nanoporous) materials are promising methods for the removal of $CO_2$, avoiding regeneration and corrosion problems resulting from traditional solvent absorption methods. A number of nanoporous materials have already shown potential for this specific gas separation due to their small pore sizes and their narrow pore-size distribution. Many studies have tried to address the $CO_2$ separation problem by using microporous materials, such as 5A, 13X$^I$ and Clinoptilolite zeolites, mesoporous silica material SBA-15, and carbon molecular sieves (CMS), respectively. For instance, 5A-type zeolites have been used for air purification applications, such as in adsorption devices to remove excess carbon dioxide from breathing air in aerospace vehicles cabins. At a concentration of ca. 900 ppm $CO_2$, the 5A-zeolite adsorbed approximately 1.5-wt % of the gas. It is important to point out that there have been also some efforts towards the development of membranes for $CO_2$ removal. Tsapatsis and co-workers (incorporated herein by reference) developed a silicalite-1 membrane supported on porous alumina disks that displayed some selectivity towards $CO_2$. The highly oriented membranes considerably improved the otherwise low selectivity exhibited by silicalite powders. Recently, Falconer and co-workers (incorporated herein by reference) reported the preparation of $Na^+$-SAPO-34 membranes via in situ crystallization on α-alumina tubular and porous stainless steel supports. These membranes were used to separate $CO_2$ from $CH_4$ and other gases, achieving also good selectivities. Among all of these adsorbent alternatives, SAPO-34 materials hold the most promise and therefore are the focus of this invention.

Figure 1:
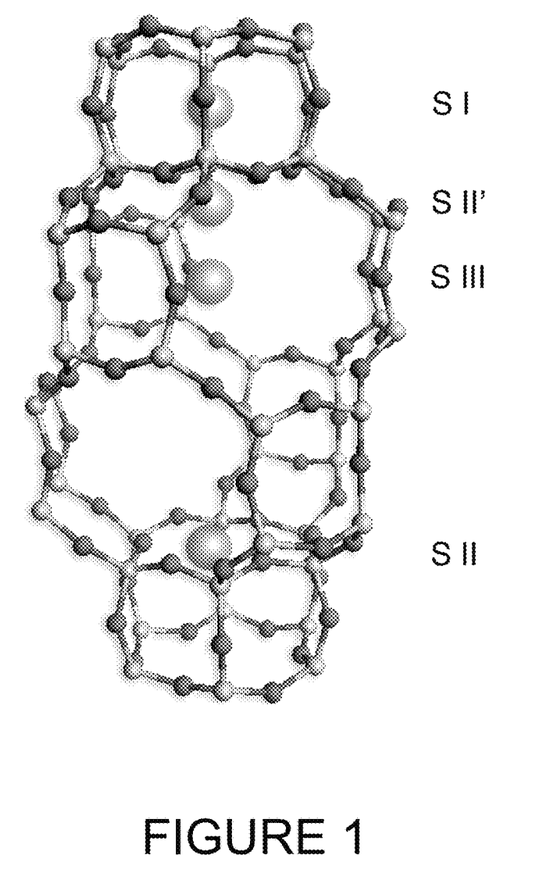
FIG. 1 shows Chabazite framework with possible cation positions.

Silicoaluminophosphates (SAPOs) are crystalline nanoporous (or microporous according to the IUPAC classification for pore diameters) materials formed by silicon, aluminum, phosphorous, and oxygen atoms in tetrahedral coordination. The atoms are arranged in an orderly fashion and form frameworks with a variety of geometries. SAPO-34 has the framework characteristics of natural zeolite Chabazite (CHA) as shown in FIG. 1. This molecular sieve includes 8-ring apertures (~4 Å) that permit access to a 3-D channel and barrel-shaped cage system. Such geometry allows molecules with small kinetic diameters to easily diffuse through the crystal structure. SAPOs also have a framework with a net charge that varies depending upon how the silicon substitution into an aluminophosphate group is achieved. That is, if silicon is substituted for aluminum, phosphorous, or both, the resulting net charge will be +1, −1 or 0, respectively. Studies have shown that usually the second and third substitution mechanisms are present during the crystallization process. Therefore, the SAPOs framework requires the presence of counterbalance species, such as cations and/or anions. These ions affect the pore size and geometry, causing potential blockage of certain molecules and limiting the diffusion of some species through the structure. In addition, these extraframework species provide effective functionalization of the sorbent surface since they can induce specific sorbate-to-sorbent energy interactions. Several cation sites in Chabazite-like materials have been identified as seen on FIG. 1. The principal cation positions are in the center of a hexagonal prism (Site I), in the center of the six-ring window (Site II), in the cavity displaced from the six-ring window (Site II'), and near the center of the eight-ring window (Site III). Given the influence of cation sites in adsorption processes, the specification will occasionally refer to these positions.

The nature of extra framework cationic species in SAPO-34 considerably affects the sorbent performance, particularly the interaction with $N_2$ and $CH_4$ gases. For instance, isosteric heat of adsorption data showed that nitrogen molecule interaction with the sorbent increases according to the extra framework species as follows: $Mg^{2+}<Ti^{3+}<Ce^{3+}<Ca^{2+}<Ag^+<Na^+<Sr^{2+}$.

Hence, it is necessary to find alternative methods that could achieve $CO_2$ separation in a selective and effective way at ambient conditions.

SUMMARY OF THE INVENTION

The present invention focuses on the ion-exchanged $M^{n+}$-SAPO-34 materials for the adsorption of $CO_2$ at temperatures and pressures that approach ambient conditions.

According to an aspect of the invention, a $M^{n+}$-SAPO-34 material was prepared by ion-exchanging $Na^+$-SAPO-34 with Ag+, Ca2+, Mg2+, Sr2+, Ce3+ and Ti3+ cations.

BRIEF DESCRIPTION OF THE DRAWINGS

Further features and advantages of the invention will become apparent from the following detailed description taken in conjunction with the accompanying figures, in which.

DETAILED DESCRIPTION OF THE INVENTION $Na^+$-SAPO-34 according to the invention was prepared by hydrothermal crystallization of saturated gels containing a molecular structure-directing agent (SDA). Reactants used were aluminum isopropoxide (Aldrich), o-phosphoric acid (85 wt %, Sigma-Aldrich), colloidal silica (30 wt % SiO2 LUDOX AM-30, Sigma-Aldrich), sodium hydroxide (Sigma), tetraethylammonium hydroxide (TEAOH, Fluka), and distilled/deionized water. Several batches were prepared using saturated gels each with the following oxide molar composition formula: 0.5(TEA)2O:0.3Na2O3:1.3Al2O3:0.6SiO2:P2O5:60H2O. The mixture was heated to 473 K inside a sealed Teflon lined autoclave under autogenous pressure for approximately 8 days. The final product was then filtered and washed with copious amounts of deionized/distilled water. The resulting solid was dried at 373 K for 24 hours in a forced convection oven. The TEAOH was removed from the porous material framework by calcination methods using flowing air in a computer-controlled muffle furnace. Using a ramp procedure at a heating rate of 10 K/min, the sample was heated to three consecutive temperature set points: 1 hour at 373 K, 1 hour at 473 K, and finally 15 hours at 773 K. It should be mentioned that better porosity and crystal quality were obtained when the samples were pretreated in vacuum for 24 hours at 673 K.

Preparation of Ion-Exchanged Materials.

$M^{n+}$-SAPO-34 samples were prepared by ion-exchanging $Na^+$-SAPO-34 with Ag+, Ca2+, Mg2+, Sr2+, Ce3+ and Ti3+ cations, respectively.

Adsorption Equilibrium Isotherms and Uptake Rates.

Equilibrium isotherm and diffusion adsorption data were obtained using two static low-pressure volumetric adsorption systems (Micromeritics ASAP 2020) outfitted with turbo molecular drag pumps. Adsorbate gases used were H2 (Ultra High Purity Grade, Linde), O2 (Ultra High Purity Grade, Linde), CO2 (Ultra High Purity Grade, Praxair) and He (High Purity Grade, Linde). The latter was used as a backfill gas after the sorbent activation. The inert gas was removed via ultra-high vacuum prior to adsorption tests. All SAPO samples were pre-treated in vacuum at 648 K to remove water molecules strongly bound inside the structure. The temperature ramp, evacuation rate, and vacuum set used were 10 K/min, 50 mmHg/s and 20 µmHg, respectively. Carbon dioxide equilibrium and uptake tests were performed at temperatures ranging from 273 to 348 K and pressures up to 1 atm. Tests for H2 and O2 were performed only at 298 K. During the experiments, the temperature was kept constant by means of either a water bath or a heating blanket.

It should be mentioned that the kinetic data were corrected to compensate for the equipment effective dead time (~0.3 seconds) and for any instability caused by the system. The equipment collection data step was set to 0.1 seconds.

Equilibrium adsorption data for the $M^{n+}$-SAPO-34 sorbents were fitted using the Sips Equation (Langmuir-Freundlich):

$$q = q_{sat,i} \frac{(K_{LF}P_i)^{1/n_h}}{1+(K_{LF}P_i)^{1/n_h}}$$

In this equation, $n_h$ is the system heterogeneity parameter, which is usually greater than unity. The larger the parameter, the more heterogeneous is the system. A justification for the use of this pure component adsorption isotherm model will be explained later.

Isosteric Heat of Adsorption.

The isosteric heats of adsorption were estimated using the Clausius-Clapeyron equation and pure component equilibrium adsorption data at different temperatures and constant surface loading. The isosteric heat of adsorption ($\Delta H_{ads}$) is given by:

$$\left(\frac{d\ln P}{d(1/T)}\right)\bigg|_{q=const} = \frac{\Delta H_{ads}}{R}$$

Isothermal VPSA Cycle Numerical Calculations.

The isothermal VPSA model used in this study consisted of a simple cyclic batch separation process with consecutive adsorption steps at 1 atm. Test were performed until achieving desired product purity (e.g., 99.9999% CH4). The pressurization step assumed no mass transfer between the gas and solid phases, which is also known as the "frozen column" state. Inter-crystalline diffusion resistance was also assumed to be negligible when compared to the resistance offered by the micropores of the sorbent. The equilibrium data for multicomponent adsorption was estimated using the extended Langmuir-Freundlich isotherm model, also known as the loading ratio correlation (LRC). The linear driving force (LDF) model was used to describe the mass transfer involved in the various steps of the cycle. Diffusion time constants at zero coverage were estimated by fitting experimental data with the solution of the fractional uptake phenomenological model for spherical particles. The diffusion time constant were corrected for concentration dependence using the Cheng and Yang's model, which is used for diffusion in zeolites where the molecules dimensions come close to that of the channel opening. Based on all of the above assumptions, the model equations for the VPSA processes are summarized in Table 1. The resulting differential equations were solved using a variable order solver based on the numerical differentiation formulas (NDFs) or by the implicit finite difference using an explicit Runge-Kutta method.

TABLE 1

| Component Mass Balance | $\frac{dy_i}{dt} + \frac{RT}{P}\frac{1-\varepsilon_{bed}}{\varepsilon_{bed}}\rho_{particle}\left(\frac{dq_i}{dt} - y_i\sum_{i=1}^{n}\frac{dq_i}{dt}\right)$ |
|---|---|
| Overall Mass Balance | $\frac{1}{P}\frac{dP}{dt} + \frac{RT}{P}\frac{1-\varepsilon_{bed}}{\varepsilon_{bed}}\rho_{particle}\left(\sum_{i=1}^{n}\frac{dq_i}{dt}\right)$ |

TABLE 1-continued

Multicomponent Isotherm $$q_i^* = \frac{q_{sat,i}(K_iP_i)^{\frac{1}{n_i}}}{1 + \sum_{j=1}^{n}(K_jP_j)^{\frac{1}{n_j}}}$$

Linear Driving Force Model $$\frac{dq_i}{dt} = 15\frac{D_{e,i}}{R_p^2}(q_i^* - q_i)$$

Diffusion Coefficients $$D_e = \frac{\varepsilon_{particle}}{\tau_{particle}} \frac{D_S D_M}{D_S + D_M}$$

$$D_S = \frac{D_o(1 - \theta + (\lambda/2)\theta(2 - \theta) + (1 - \lambda)(\lambda/2)\theta^2}{(1 - \theta + \lambda\theta/2)^2}$$

$$D_M = \frac{100T^{1.75}\sqrt{\frac{M_{wCH_4} + M_{wCO_2}}{M_{wCH_4}M_{wCO_2}}}}{P(D_{VCH_4}^{1/3} + D_{VCO_2}^{1/3})^2}$$

Results and Discussion

Carbon Dioxide Pure Component Equilibrium Adsorption in $M^{n+}$-SAPO-34 Sorbents.

Figure 2:
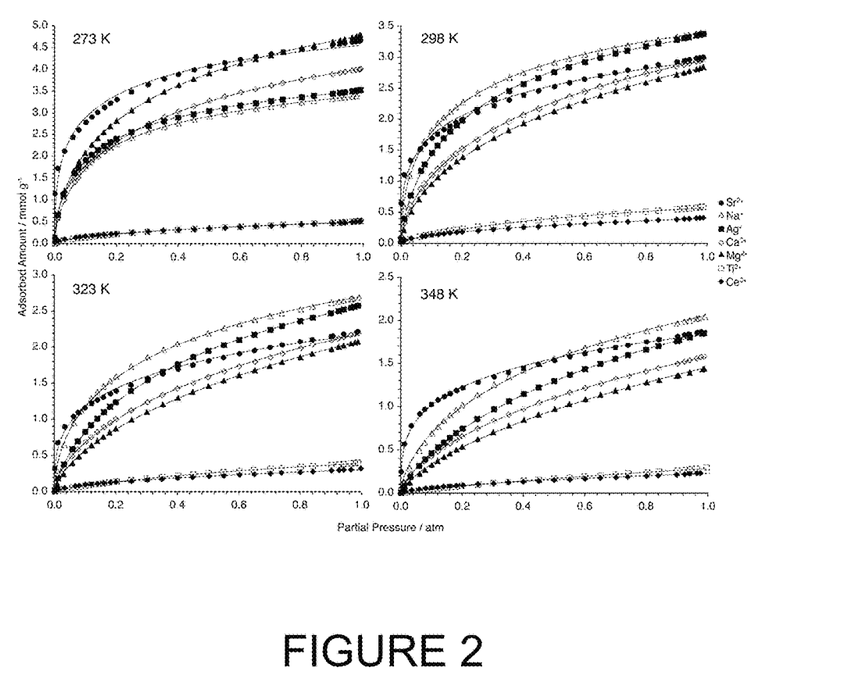
FIG. 2 shows adsorption isotherms of $CO_2$ on $M^{n+}$-SAPO-34 at 273, 298, 323 and 348 K, respectively, wherein solid lines represent Langmuir-Freundlich fits.

A combination of textural properties, such as pore volume and pore blocking, and the interactions energies will have considerable influence in the uptake of the sorbates depending on the cationic species. A complete description of the cation species, surface area, pore volume and unit cell composition of all the studied sorbents after the ion-exchanged was previously described by Rivera-Ramos and Hernandez-Maldonado (incorporated herein by reference). FIG. 2 shows data for carbon dioxide equilibrium adsorption for all the SAPO-34 sorbent materials at different temperatures (273, 298, 323 and 348 K). All the sorbents displayed the classic physisorption profile, where an increase in temperature results in a decrease in uptake amounts at any given pressure. However, some of the $CO_2$ adsorption isotherms exhibited a considerable non-linear behavior and, therefore, did not follow the traditional pore-filling mechanism. Different models were evaluated to fit the data (i.e., Sips and Toth). The Sips equation showed better data adjustment and was therefore used for all sorbents cases for consistency.

Affinity constants for $CO_2$ isotherms were calculated using a qsat value obtained at 273 K. The advantage of using lower temperatures to estimate this value is appropriate since sorbate-sorbate interactions become negligible. The qsat estimated from the $Na^+$-SAPO-34 $CO_2$ isotherm data is 5.26 mmol/g. It is important to point out that this value matches well with the one obtained by Falconer and co-workers (5.0 mmol/g) using a similar approach (incorporated herein by reference).

Table 2 summarizes the heterogeneity factor results for all the sorbents at different temperatures. In general, the heterogeneity of the system with respect to carbon dioxide uptake changed as a function of temperature. This should be expected in nanoporous materials frameworks that usually have more sites (i.e., coordination states) available for the charge-balancing cations to occupy as seen on FIG. 1. The distribution of cationic species on the sites depends on the temperature of heat-treatment, the nature of the species, and the degree of hydration.

TABLE 2

| Temp. (K) | $Na^+$-SAPO-34 | $Ag^+$-SAPO-34 | $Mg^{2+}$-SAPO-34 | $Ca^{2+}$-SAPO-34 | $Sr^{2+}$-SAPO-34 | $Ti^{3+}$-SAPO-34 | $Ce^{3+}$-SAPO-34 |
|---|---|---|---|---|---|---|---|
| 273 | 1.94 | 1.65 | 1.64 | 1.65 | 2.24 | 1.44 | 1.76 |
| 298 | 1.82 | 1.38 | 1.66 | 1.67 | 2.84 | 1.26 | 1.79 |
| 323 | 1.76 | 1.35 | 1.51 | 1.59 | 2.78 | 1.24 | 1.73 |
| 348 | 1.59 | 1.30 | 1.42 | 1.55 | 3.05 | 1.12 | 1.59 |

It is important to note that all the sorbents exhibited fully reversible adsorption-desorption paths. This is critical for regeneration cycles, since all the working sorption capacity could be regained by simple engineering means.

$Ag^+$-SAPO-34

Usually, an increase in cation size of monovalent species results in a decrease of the adsorption capacity in some zeolites. In terms of sorption characteristics, at 273 and 298 K the $CO_2$ adsorption amounts in the Ag(I) exchanged materials are comparable to those obtained for $Na^+$-SAPO-34. However, as the process temperature is increased, a decrease in the adsorbed amount was observed when compared also to the $Na^+$-sorbent at the same conditions as shown in FIG. 2. Sorbents with certain transition metal cations are known to form π-complexation bonds with some sorbates (e.g. $N_2$, CO). But the carbon dioxide monodentate adsorption mechanism will probably avoid this kind of complexation, resulting in a decrease in interaction with the sorbate at low pressure ranges when compared with other sorbent that exhibit the same adsorption capacity at higher pressures.

$Mg^{2+}$-SAPO-34

With the exception of the 273 K test results, this material adsorbed less carbon dioxide at 1 atm when compared to the unmodified material. Based on the observed behavior, it is plausible to state that $Mg^{2+}$ cations offer partial blocking of the pore window, affecting the entrance of the sorbate molecules into the crystal framework. It should be mentioned that at 273 K, this material produced an adsorbed amount at 1 atm comparable to that of the $Sr^{2+}$-SAPO-34 sorbent. The $CO_2$ adsorption in strontium-exchanged materials will be discussed shortly.

$Ca^{2+}$-SAPO-34

At 273 K, this sorbent adsorbed more carbon dioxide than $Na^+$- and $Ag^+$-SAPO-34 materials, respectively. At 298 and 323 K, the adsorbed amounts (~1 atm) are only comparable to those obtained with $Sr^{2+}$-SAPO-34 as shown in FIG. 2. The $Ca^{2+}$-SAPO-34 material also showed heterogeneity factors comparable to those obtained for $Mg^{2+}$-SAPO-34. With this behavior trend, it could be stated that $Mg^{2+}$ and $Ca^{2+}$ cations occupied similar sites (SII') as seen on FIG. 1 within the Chabazite framework.

$Sr^{2+}$-SAPO-34

Figure 3:
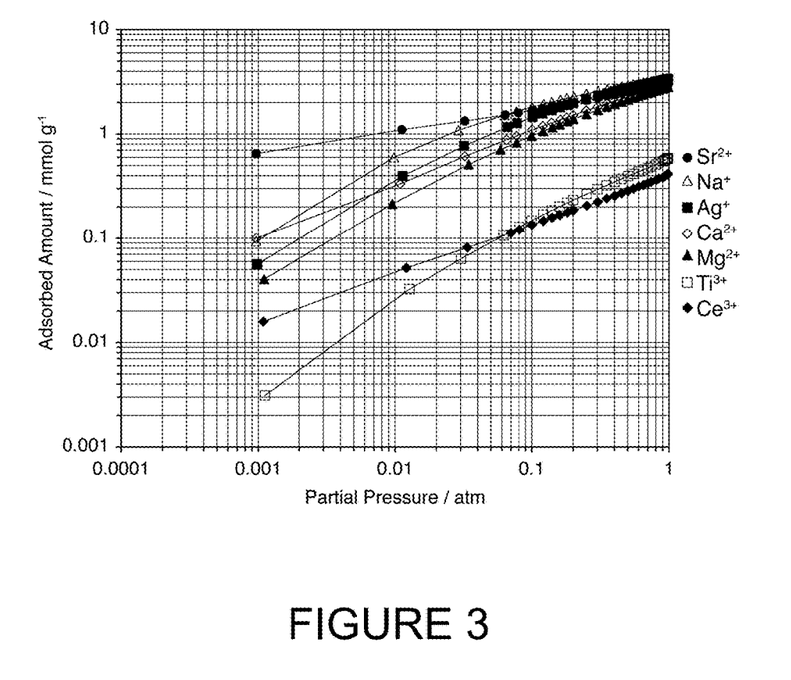
FIG. 3 shows adsorption isotherms in a log-log scale of $CO_2$ on $M^{n+}$-SAPO-34 at 298 K.

The shape of the adsorption isotherms in this material is sound evidence of stronger sorbent-sorbate interactions. Particularly when compared to the other $M^{n+}$-SAPO-34 formulations at the low-pressure range as shown in FIG. 3. For this sorbent, the results suggest that $Sr^{2+}$ cations are sitting near window sites (site II'), producing strong interactions with the sorbates located within the relevant perimeter. With the exception of the 273 K test results, this material adsorbed less carbon dioxide at 1 atm when compared to Nat-SAPO-34. It could be stated that at 273 K, divalent cations are more exposed to interactions with the sorbate. As seen in FIG. 3, at 298 K and a partial pressure of ca. $10^{-3}$ atm (or 900 ppm), the $Sr^{2+}$-SAPO-34 sorbent adsorbs approximately 0.65 mmoles of $CO_2$ per gram of material. This translates to a sorption capacity of about 2.8-wt %, which is almost twice the observed capacity in 5A-type zeolites at similar conditions. The strong interactions presented by this material towards $CO_2$ are without a doubt ideal for adsorption applications where traces of carbon dioxide are needed to be removed from a gas mixture (i.e., ultra purification). The $Sr^{2+}$-SAPO-34 sorption performance will be discussed later.

$Ce^{3+}$-SAPO-34 and $Ti^{3+}$-SAPO-34

For these sorbents, the $CO_2$ adsorption capacities were much lower than those obtained with the other $M^{n+}$-SAPO-34 as seen on FIG. 2. It could be stated that both $Ce^{3+}$ and $Ti^{3+}$ species occupy sites near the center of the cages (SIII), where they can balance three $Al^{3+}$ tetrahedra negative charges on the framework at the same time. This coordination condition, together with the considerable relative large size of the trivalent cations, should result in some level of pore blocking.

Fractional Uptake and Diffusion Time Constant

Figure 4:
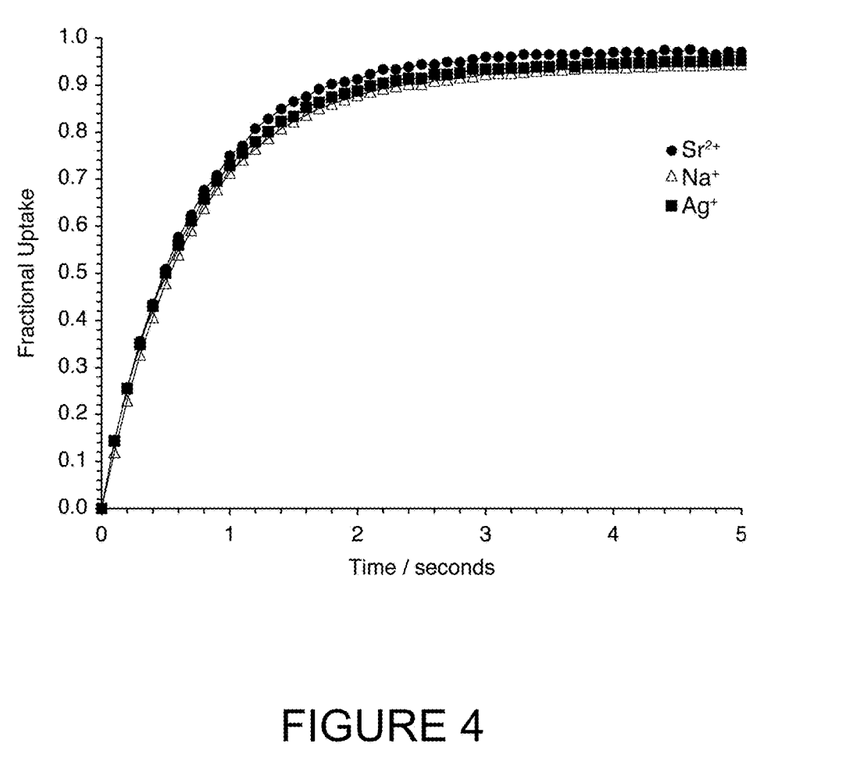
FIG. 4 shows Carbon dioxide uptake on $M^{n+}$-SAPO-34 at 298K.

FIG. 4 shows fractional uptake data for the $M^{n+}$-SAPO-34 sorbents that displayed the best $CO_2$ overall adsorption capacity (i.e., $Na^+$, $Ag^+$ and $Sr^{2+}$). The uptake data were gathered at an arbitrary constant loading condition (e.g., 1.8 mmol/g). It should be mentioned that the diffusion time constants estimated for the present sorbates (i.e. $N_2$, $CH_4$, $CO_2$) and sorbents compare very well with those available in the literature for other small pore size sorbents (i.e. Type-A zeolite, Clinoptilolite, Carbon Molecular Sieves). In general, the results suggest that the carbon dioxide molecules diffuse equally faster and independently of the nature of these metal cations. The estimated pore size for $Sr^{2+}$-SAPO-34 was smaller than the one obtained for the monovalent sorbents, suggesting this that the $Sr^{2+}$ cations are probably sitting near window sites (II and II'). It is understood however that the strong interaction between the $Sr^{2+}$ cations and the sorbent molecules are sufficient to break any steric effect that the partial blocking of the pore window by the cations could create. Diffusion time constants at near zero coverage are summarized in Table 3.

TABLE 3

| Sorbent | $D_o$ (1/s) | |
| --- | --- | --- |
|  | $CO_2$ | $CH_4$ |
| $Na^+$-SAPO-34 | 0.0065 | 0.0214 |
| $Ag^+$-SAPO-34 | 0.0078 | 0.0274 |
| $Sr^{2+}$-SAPO-34 | 0.0056 | 0.0216 |

Isosteric Heat of Adsorption ($\Delta H_{ads}$) in $M^{n+}$-SAPO-34

Figure 5:
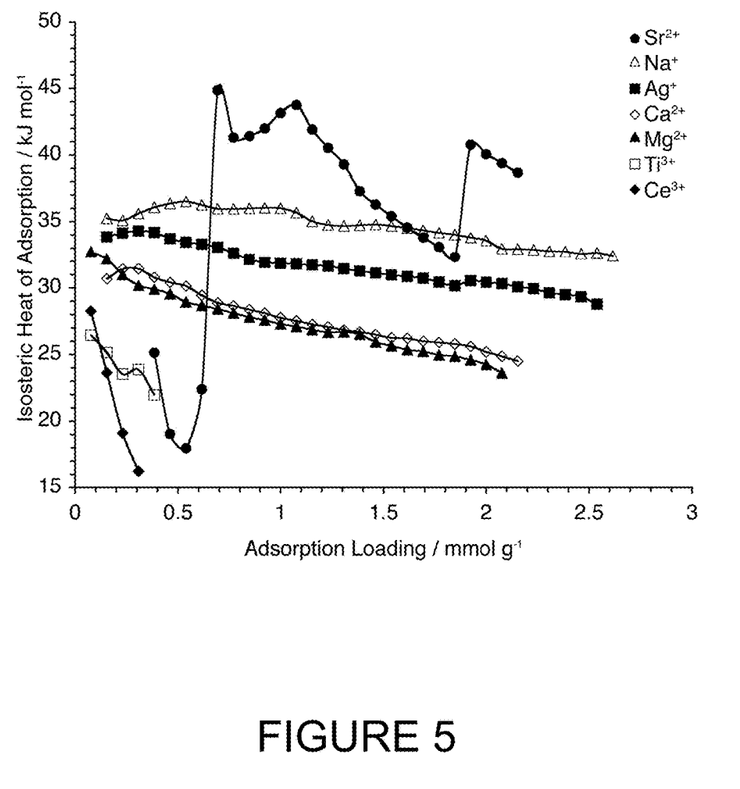
FIG. 5 shows Isosteric heat of adsorption for $CO_2$ on $M^{n+}$-SAPO-34.

Estimates of isosteric heat of adsorption for all $M^{n+}$-SAPO-34 materials correlated to physical and reversible adsorption as shown in FIG. 5. The values varied according to the type of cation exchanged into the SAPO-34 framework and the average was around 30 kJ/mol. It should be mentioned that heats observed for $Na^+$-SAPO-34 sorbents are in good agreement with calorimetric data previously reported by Gorte and co-workers (incorporated herein by reference) for the adsorption of $CO_2$ in NaX zeolite. In addition, many of the adsorbents displayed little degree of heterogeneity, which correlates well with the results shown in Table 2. The only exception was the Sr(II) exchanged material.

It can be seen from FIG. 5 that the $Sr^{2+}$-SAPO-34 sorbents have higher interactions with $CO_2$ when compared to the other $M^{n+}$-SAPO-34 materials. The variation of the isosteric heats as a function of adsorption loading was also very notable for this sorbent as shown in FIG. 5. This is in good agreement with the heterogeneity factors (largest tin factor) estimated for this material as shown in Table 2 above. Noting that the maximum heat of adsorption occurs at 0.65 mmol/g as seen on FIG. 5 and taking into consideration that the sorbent unit cell composition is given by $|Na^+_{0.31} Sr^{2+}_{1.05} H^+_{2.77}| [Si_{4.34} Al_{18.42} P_{13.24} O_{72}]$ as previously reported by the inventors, then there are one $CO_2$ molecule adsorbed per $Sr^{2+}$ cation at this point. The adsorption heat maximum observed for the $Sr^{+2}$ sorbent should be a result of the quadrupole moment interaction between the sorbate and the electric field generated by the cations on the SAPO-34 surface. Thus, it can be said that once the carbon dioxide molecules have interacted with all the available $Sr^{2+}$ cations, the sorbate continues to interact with the $Na^+$ cations that are still present in the material. This corresponds to the subsequent energy decrease at higher loadings as seen on FIG. 5. The average isosteric heat of adsorption in the 1-2 mmol/g loading region matches well with those observed for $Na^+$-SAPO-34. Additional deviations in the heat of adsorption are probably due to sorbate-sorbate interactions within the cages of the structure.

The $Sr^{2+}$-SAPO-34 sorption capacity could be further improved if additional extraframework $Sr^{2+}$ cations are introduced. As previously mentioned, the observed unit cell composition shows that $Na^+$ cations are still present in the structure.

$CH_4$, $CO_2$, $H_2$, $N_2$ and $O_2$ Pure Component Equilibrium Adsorption in $Na^+$-SAPO-34, $Ag^+$-SAPO-34 and $Sr^{2+}$-SAPO-34

Figure 6:
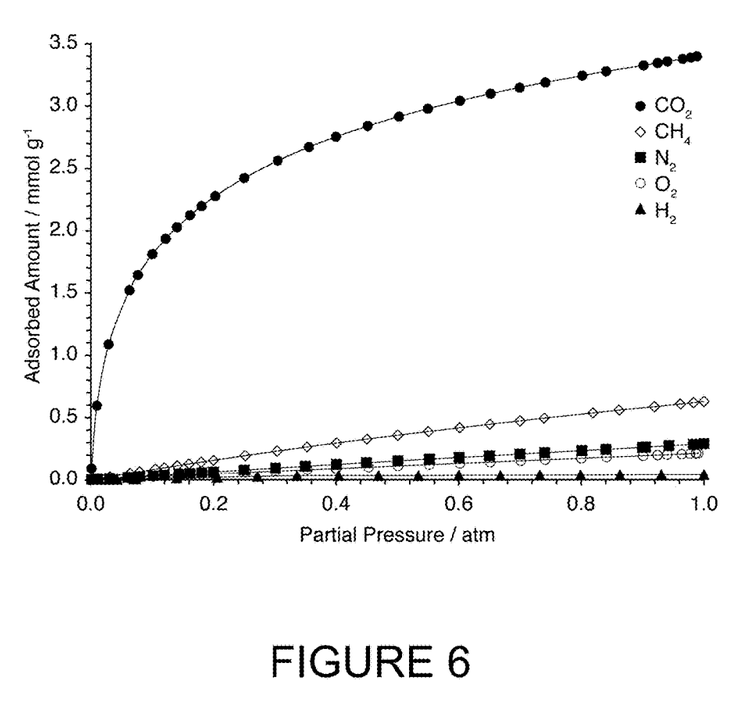
FIG. 6 shows pure component adsorption isotherms for $CO_2$, $CH_4$, $H_2$, $N_2$ and $O_2$ on $Na^+$-SAPO-34 at 298 K.
Figure 7:
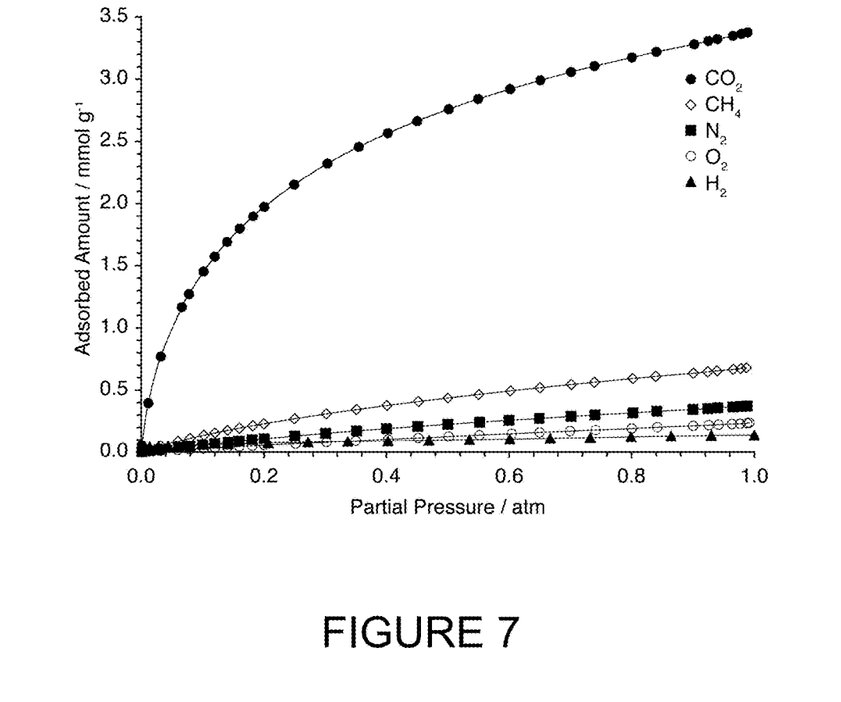
FIG. 7 shows pure component adsorption isotherms for $CO_2$, $CH_4$, $H_2$, $N_2$ and $O_2$ on $Ag^+$-SAPO-34 at 298 K. SAPO-34 at 298 K.
Figure 8:
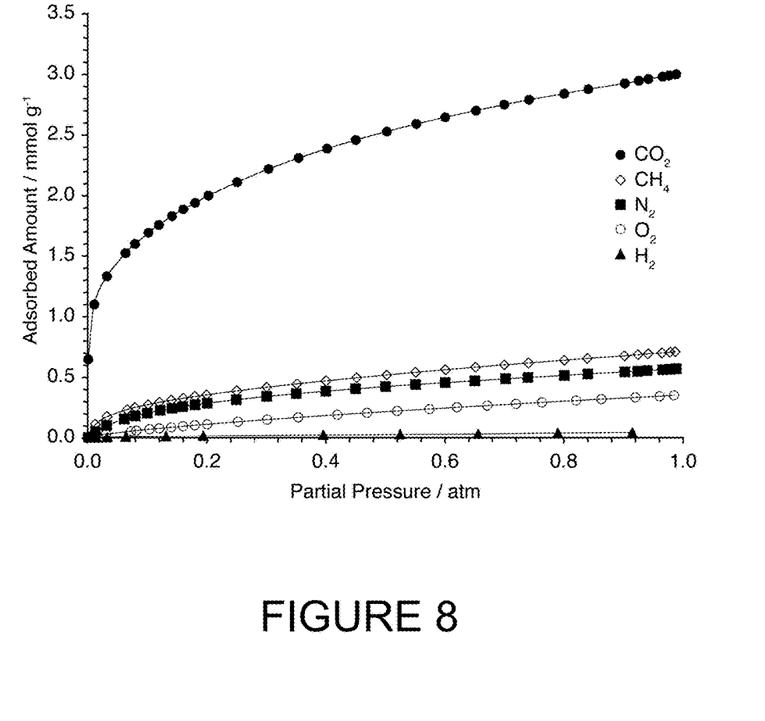
FIG. 8 shows pure component adsorption isotherms for $CO_2$, $CH_4$, $H_2$, $N_2$ and $O_2$ on $Sr^{2+}$-SAPO-34 at 298 K. SAPO-34 at 298 K.

Although typical natural gas mixtures consist mainly of $CH_4$, these also include significant quantities of $CO_2$, $N_2$ and traces of $O_2$ and $H_2$. The portion of impurities gases is usually less than 5 percent of the total, but there are some reservoirs where the share can be much larger. The adsorption behavior of all of these sorbates in the studied sorbents was analyzed to determine the potential of the $M^{n+}$-SAPO-34 sorbents for natural gas purification. FIGS. 6-8 show the pure component adsorption isotherms for all of the aforementioned gases in $Na^+$-SAPO-34, $Ag^+$-SAPO-34 and $Sr^{2+}$-SAPO-34, respectively. In general, the sorbents displayed a remarkable selectivity towards $CO_2$ at all partial pressures. This invention focuses on the contributions to the surface potential or adsorption energy to explain the observed selectivity behavior.

The shape of the isotherms is an immediate reflection of the sorbate-sorbent interactions or the heat of adsorption. For physisorption level interactions, the heat of adsorption can be related to several components. These include dispersion and repulsion energies (nonspecific) and additional components attributed to electrostatic interactions (specific). Nonspecific interactions ($\phi_D$ and $\phi_R$) strongly depend on the polarizability, $\alpha$. Although the sorbates magnetic susceptibility also affects these interactions, the contribution is not as strong as the one provided by the polarizability. For the nonspecific interaction, the following dependence holds:

Dispersion:

$$\phi_D \propto -\frac{\alpha}{r_o^6}$$

Repulsion:

$$\phi_R \propto \frac{\alpha}{2r_o^6}$$

where $r_o$ is the contact distance between the centers of the interacting pair. The kinetic diameters of $CO_2$, $CH_4$ and $N_2$ are 3.30, 3.80 and 3.64 Å, respectively. Meanwhile, the to polarizabilities ($\alpha$) are $29.1 \times 10^{-25}$, $25 \times 10^{-25}$ and $17.6 \times 10^{-25}$ cm$^3$, respectively. A simple inspection of these values will lead to the conclusion that $CO_2$ will have a slight advantage in the nonspecific interactions region. Therefore, this type of interaction contribution does not offer a satisfactory explanation for the considerable selectivity exhibited by the sorbents as shown in FIGS. 6-8 and it is necessary to consider the specific contributions.

Specific contributions ($\phi_{Ind}$, $\phi F_\mu$ and $\phi_{FQ}$) arise from charges on the solid surface. However, since $CO_2$, $CH_4$ and $N_2$ do not have a permanent dipole, $\phi F_\mu = 0$. For the remaining specific interactions, the following dependence holds:

Induction (Field-Induced Dipole):

$$\phi_{Ind} \propto \frac{q_c^2 \alpha}{r_o^4}$$

Field Gradient-Quadrupole $$\phi_{FQ} \propto \frac{q_c Q}{r_o^3}$$

where $q_c$ is the electronic charge of the cation and Q is the quadrupole moment. $CO_2$ has a strong quadrupole moment ($-4.3 \times 10^{-26}$ erg$^{1/2}$ cm$^{5/2}$) and should make a significant contribution to the total interaction potential or heat of adsorption. In fact, the $CO_2$ quadrupole moment is 3 times greater than that of $N_2$. Since $CH_4$ molecules do not exhibit a quadrupole moment, the observed high selectivity towards $CO_2$ can only be attributed to its relatively strong quadrupole moment interaction with the cation electric field. Such interaction should also provide the ability to break steric barriers, if any, that the small channels of the framework could generate.

The diffusion time constants at near zero coverage and the isotherm parameters values used for the simulation are summarized in Table 3 (above) and Table 4, respectively. VPSA cycle parameters are shown in Table 5. The calculations involving the $Sr^{2+}$-SAPO-34 sorbent were carried out using a Runge-Kutta routine due to the strong non-linearity that produces the observed heterogeneity factor. The NDFs method was used instead for the $Na^+$-SAPO-34 and $Ag^+$-SAPO-34 cases. Table 6 shows a summary of the simulation results. In general, the results are in good agreement with the pure component adsorption isotherm data behavior previously described. $Sr^{2+}$-SAPO-34 required the smaller number of steps to obtain the achieve product purity and presented an acceptable adsorbed phase ratio. The sorbents exhibiting lower $CO_2$ interactions at low pressures (i.e., $Na^+$-SAPO-34 and $Ag^+$-SAPO-34) required additional VPSA step to achieve the required product purity. Based on these results, all the materials are certainly capable sorbents for this kind of separation. However, $Sr^{2+}$-SAPO-34 showed the strongest $CO_2$ sorbate-sorbent interactions.

TABLE 4

| Sorbent | $q_{sat}$ (mmol/g) | | $K_{LF}$ (1/atm) | | n | |
|---|---|---|---|---|---|---|
| | $CO_2$ | $CH_4$ | $CO_2$ | $CH_4$ | $CO_2$ | $CH_4$ |
| $Na^+$-SAPO-34 | 5.264 | 2.127 | 2.989 | 0.412 | 1.817 | 1.000 |
| $Ag^+$-SAPO-34 | 4.879 | 1.654 | 2.951 | 0.660 | 1.384 | 1.104 |
| $Sr^{2+}$-SAPO-34 | 6.707 | 2.003 | 0.498 | 1.893 | 2.839 | 1.893 |

TABLE 5

| Parameters | Values |
|---|---|
| Feed Pressure | 1 atm |
| Temperature (T) | 298 K |
| Particle Density[1] ($\rho_{particle}$) | $1.06 \times 10^3$ kg/m$^3$ |
| Bed Void[1] ($\varepsilon_{bed}$) | 0.348 |
| Diffusion Volume[59] ($D_v$) | 26.7 ($CO_2$); 25.14 ($CH_4$) |
| Particle Porosity[1] ($\varepsilon_{particle}$) | 0.38 |
| Particle Tortuosity[1] ($\tau_{particle}$) | 4.5 |
| Particle Radius ($R_p$) | $0.6 \times 10^{-6}$ m |

TABLE 6

| | Feed Composition ($CO_2/CH_4$) (mole %) | | | | | |
|---|---|---|---|---|---|---|
| | 20/80 | | 10/90 | | 5/95 | |
| Sorbent | Steps Required | Adsorbed Phase Ratio ($CO_2/CH_4$) | Steps Required | Adsorbed Phase Ratio ($CO_2/CH_4$) | Steps Required | Adsorbed Phase Ratio ($CO_2/CH_4$) |
| $Na^+$-SAPO-34 | 22 | 0.0291 | 17 | 0.0181 | 4 | 0.2247 |
| $Ag^+$-SAPO-34 | 34 | 0.0527 | 33 | 0.0259 | 32 | 0.0130 |
| $Sr^{2+}$-SAPO-34 | 6 | 0.4726 | 4 | 0.3619 | 3 | 0.2810 |

VPSA for $CO_2$ and $CH_4$ Separation: Simulation Results

The following paragraphs will explain the potential of the sorbents to achieve the desire separation of a binary system using a rather simple transient simulation method. Since obtaining empirical data on multi-component adsorption is beyond the scope of this invention, a simple mathematical modeling approach for the $CO_2/CH_4$ separation was carried out for the most promising studied sorbents ($Ag^+$-SAPO-34, $Na^+$-SAPO-34 and $Sr^{2+}$-SAPO-34).

The present invention has shown that ion-exchanged $M^n$-SAPO-34 materials are promising sorbents for the selective removal of $CO_2$ at temperatures and pressures that approach ambient conditions. In terms of overall adsorption performance, the exchanged materials exhibited the following trend: $Ce^{3+} < Ti^{3+} < Mg^{2+} < Ca^{2+} < Ag^+ < Na^+ < Sr^{2+}$. Strontium(II) exchanged SAPO-34 was by far the best sorbent in the low-pressure region. The isosteric heat of adsorption data suggested that all the exchanged $Sr^{2+}$ species were exposed to the Chabazite cages, but did not provide transport resistance or pore blocking. Uptake data indicated that the adsorption kinetics for $CO_2$ in the $Ag^+$, $Na^+$, and $Sr^{2+}$ exchanged materials were fast, evidencing again the absence of transport resistance within the pore channels. Binary component adsorption ($CO_2/CH_4$) simulation data corroborated that, among the sorbents studied, the strontium(II) exchanged ones were by far superior. It should be pointed out that all the sorbents studied can be fully regenerated by simple engineering means since the adsorption interactions were in the physisorption range.

Sorbent Synthesis Optimization

In order to maximize the SAPO framework surface area, the hydrothermal synthesis was performed under vigorous mixing. In addition, longer aging times were employed prior to final mixing of the source materials.

Preparation of Ion-Exchanged Materials: Single Step Liquid Phase Ion Exchange Procedure The exchange procedure was optimized to increase the metal cation concentration gradient and, therefore, an increase in diffusion flux towards the solid phase. This strategy was aimed at achieving the highest exchange possible. The process temperature was fixed at 60° C. and the solid was recovered via mild vacuum filtration after 24 hours.

Example

Exchange of $Na^+$ present in the asynthesized porous framework with $Sr^{2+}$. The solubility of the salt ($SrCl_2.6H_2O$) in water is ca. 1062 g/L $H_2O$ at 20° C. An undersaturated solution was obtained using a following salt-to-water weight ratio of 2.4 g/50 g, which corresponds to a 4 fold excess amount (5.2<pH<5.6). About 1 gram of the SAPO porous framework was added to the aforementioned salt/water solution and the temperature was adjusted to 60° C. The exchange was performed for 24 hours under vigorous mixing. The resulting solid particle were recovered via filtration and washed with ca. 3 liters of distilled/deionized water. The resulting cake was dried at 90° C. for 24 hours.

Example

Exchange of $Na^+$ present in the asynthesized porous framework with $Ba^{2+}$. The solubility of the salt ($BaCl_2$) in water is ca. 375 g/L $H_2O$ at RT. An undersaturated solution was obtained using a following salt-to-water weight ratio of 4 g/500 g (5.3<pH<5.7). About 1 gram of the SAPO porous framework was added to the aforementioned salt/water solution and the temperature was adjusted to 60° C. The exchange was performed for 24 hours under vigorous mixing. The resulting solid particle were recovered via filtration and washed with ca. 3 liters of distilled/deionized water. The resulting cake was dried at 90° C. for 24 hours.

Preparation of Ion-Exchanged Materials: Multiple Step Liquid Phase Ion Exchange Procedure Consecutive exchanges (up to 3) were employed to approach the 100% cation replacement mark. All the steps were performed at 60° C. and for 24 hours. Recovery of the solids between exchanges was achieved through mid vacuum filtration and drying at 90° C. in a forced convection oven for 24 hours.

Figure 9:
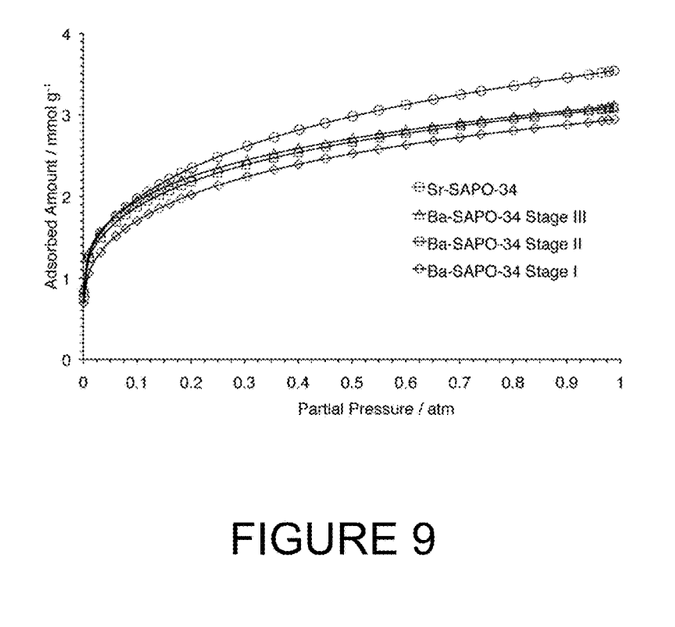
FIG. 9 shows pure component adsorption isotherms for $CO_2$ on Ba2+-SAPO34 at 298 K.

Carbon Dioxide Pure Component Equilibrium Adsorption in $Ba^{2+}$-SAPO-34 Sorbents Example Tests for carbon dioxide equilibrium adsorption in barium exchanged SAPO-34 powder indicate that it is possible to reach the low pressure sorption capacities exhibited by the strontium-based material counterpart by means of a multiple stage ion exchange strategy as shown in FIG. 9. Sorbents that are sequentially exchanged with barium cations show an increase in $CO_2$ sorption capacity at partial pressures below 0.1 atm. Such behavior evidences incorporation of barium cations in exposed adsorption sites. At higher pressures, however, all the barium based sorbents exhibit a considerable decrease in adsorption capacity perhaps due to the large cation size. The latter should produce an effective reduction in pore volume and hence sorption capacity at pressures near 1 atm.

Sorbent Regeneration

The sorbents were tested for adsorption reversibility by means of volumetric techniques. After in situ activation of the sorbents, CO2 was allowed to adsorb in the porous materials at the different pressure increments at equilibrium. After achieving the instrument maximum pressure (i.e., 1 atm), the system pressure was reduced in small intervals and the CO2 desorption amounts registered.

Example

Figure 10:
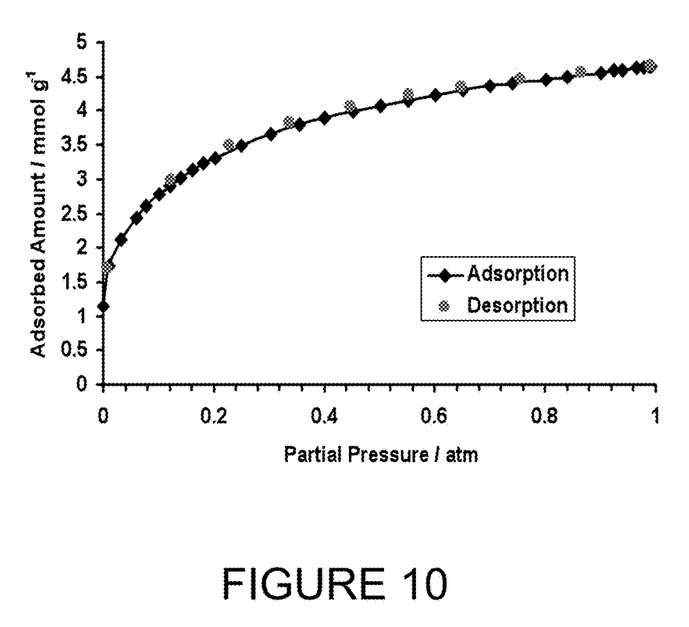
FIG. 10 shows adsorption and desorption isotherms of $CO_2$ on Sr2+-SAPO-34 at 273 K.

FIG. 10 shows data for the adsorption and desorption of carbon dioxide in Sr2+-SAPO-34 at 273K. These results confirm that the adsorption process is a fully reversible one and that our material could be fully regenerated under vacuum swing conditions.

Because many varying and differing embodiments maybe made within the scope of the inventive concept herein taught and because many modifications may be made in the embodiment herein detailed in accordance with the descriptive requirement of the law, it is to be understood that the details herein are to be interpreted as illustrative and not in a limiting sense.

We claim:

1. A method of preparing a nanoporous adsorbent material comprising:
    crystallizing a gel containing an alumina source, a silica source, a phosphorous source, a sodium source and a structure-directing agent to obtain a porous material framework;
    removing said structure-directing agent from said porous material framework in order to obtain $Na^+$-SAPO-34, the sodium cations being extra-framework of SAPO-34 material; and
    ion-exchanging said $Na^+$-SAPO-34 with metal cations to produce a $M^{n+}$-SAPO-34 material, where M is a metal and n is an integer, the metal being extra-framework of SAPO-34 material and occupying exposed sites within the framework of said SAPO-34 previously occupied by said sodium cations.

2. The method of claim 1, wherein said gel is hydrothermally crystallized.

3. The method of claim 1, wherein said sodium source comprises sodium hydroxide.

4. The method of claim 1, wherein said structure-directing agent comprises tetraethylammonium hydroxide (TEAOH).

5. The method of claim 1, wherein said gel have an oxide molar composition formula: 0.5 $(TEA)_2O$:0.3$Na_2O_3$: 1.3$Al_2O_3$ 0.6$SiO_2$:$P_2O_5$:60$H_2O$.

6. The method of claim 1, wherein said $Na^+$-SAPO-34 is ion-exchanged with $Ag^+$ to form $Ag^+$-SAPO-34.

7. The method of claim 1, wherein said $Na^+$-SAPO-34 is ion-exchanged with $Mg^{2+}$ to form $Mg^{2+}$-SAPO-34.

8. The method of claim 1, wherein said $Na^+$-SAPO-34 is ion-exchanged with $Ca^{2+}$ to form $Ca^{2+}$-SAPO-34.

9. The method of claim 1, wherein said $Na^+$-SAPO-34 is ion-exchanged with $Sr^{2+}$ to form $Sr^{2+}$-SAPO-34.

10. The method of claim 1, wherein said $Na^+$-SAPO-34 is ion-exchanged with $Ti^{3+}$ to form $Ti^{3+}$-SAPO-34.

11. The method of claim 1, wherein said $Na^+$-SAPO-34 is ion-exchanged with $Ce^{3+}$ to form $Ce^{3+}$-SAPO-34.

12. The method of claim 1, wherein said $M^{n+}$-SAPO-34 material selectively adsorbs at least one of: $CO_2$, $CH_4$, $H_2$, $N_2$ and $O_2$.

13. A method of preparing a nanoporous adsorbent material comprising:
   crystallizing a gel with an oxide molar composition formula: $0.5\ (TEA)_2O:0.3Na_2O_3:1.3Al_2O_3:0.6SiO_2:P_2O_5:60H_2O$ to obtain a porous material framework;
   removing tetraethylammonium hydroxide (TEAOH) from said porous material framework in order to obtain $Na^+$-SAPO-34, the sodium cations being extra-framework of SAPO-34 material; and
   ion-exchanging said $Na^+$-SAPO-34 with metal cations to produce a $M^{n+}$-SAPO-34 material, where M is a metal and n is an integer, the metal being extra-framework of SAPO-34 material and occupying exposed sites within the framework of said SAPO-34 previously occupied by said sodium cations.

\* \* \* \* \*